United States Patent [19]

Ferri

[11] 4,045,194
[45] Aug. 30, 1977

[54] APPARATUS FOR CLEANING AIR

[75] Inventor: Johann Walter Ferri, Uster, Switzerland

[73] Assignee: Luwa AG, Zurich, Switzerland

[21] Appl. No.: 722,889

[22] Filed: Sept. 13, 1976

[30] Foreign Application Priority Data

Sept. 23, 1976 Switzerland ............ 12331/76

[51] Int. Cl.² ........................................... B01D 46/38
[52] U.S. Cl. .................................. 55/290; 55/294; 55/302; 55/337; 55/454
[58] Field of Search ............ 55/293, 290, 291, 294, 55/337, 302, 454

[56] References Cited

U.S. PATENT DOCUMENTS

| 2,474,478 | 6/1949 | Hart, Jr. ............ | 55/290 |
| 3,618,303 | 11/1971 | Nagel ............... | 55/337 |
| 3,716,968 | 2/1973 | Mische .............. | 55/294 |
| 3,864,107 | 2/1975 | Baigas, Jr. ........ | 55/290 |

FOREIGN PATENT DOCUMENTS 554,893  7/1932  Germany ................ 55/290

*Primary Examiner*—Bernard Nozick
*Attorney, Agent, or Firm*—Werner W. Kleeman

[57] ABSTRACT

An apparatus for cleaning air charged with contaminants, especially fibers and dust, comprising a pre-separator and a dust filter arranged after the pre-separator. At least one movable suction nozzle is effective at the surface of the dust filter. The pre-separator, constructed as a body of rotation, possesses an inlet portion structured for producing a spin flow and a jacket portion structured as a sieve surface which is surrounded by a rotatably mounted filter drum of the dust filter. A cylindrical filter body of the filter drum has operatively associated therewith at the inner surface thereof the movable suction nozzle, and drive means are operatively connected with the suction nozzle and filter drum.

7 Claims, 2 Drawing Figures

U.S. Patent      Aug. 30, 1977      4,045,194

APPARATUS FOR CLEANING AIR

BACKGROUND OF THE INVENTION

The present invention relates to a new and improved construction of apparatus for cleaning air charged with contaminants, especially fibers and dust, comprising a pre-separator and a dust filter arranged after the pre-separator, with a suction nozzle operatively associated with the dust filter and effective at its filter surface.

There are already known to the art apparatuses serving for the cleaning of air, for instance sucked-out of textile machine rooms wherein cleaning of the air is accomplished in two stages. The heretofore known apparatus of this type, especially such which are self-cleaning at the side of the pre-separator and therefore can be maintained continually in operation, require an exceptionally large amount of space.

SUMMARY OF THE INVENTION

Hence, it is a primary object of the present invention to provide an improved apparatus for cleaning air which requires very little space.

Another object of the present invention aims at the provision of a new and improved construction of apparatus for cleaning air which is relatively simple in construction and design, economical to fabricate, easy to service, and occupies very little space.

Now in order to implement these and still further objects of the invention, which will become more readily apparent as the description proceeds, the apparatus of the present development is manifested by the features that the pre-separator, constructed as a body of rotation, possesses an inlet portion structured for producing a spin flow and a jacket or separator portion structured as a sieve surface. The jacket portion is surrounded by a rotatably mounted filter drum, the cylindrical filter body of which has associated with the inside or inner surface thereof the movable suction nozzle. The suction nozzle and filter drum are operatively connected with drive means.

By virtue of the fact that the filter body surrounds the sieve surface such possesses a throughpassage surface which is sufficiently large for fulfilling the function of a dust filter, and at the same time the air passes in a direct path from the pre-separator to the dust filter. Both features therefore allow maintaining a low pressure drop. Due to the arrangement of the pre-separator in the dust filter the required space is reduced by more than one-half.

The apparatus, in the event it is connected with the pressure side of the system, can also be directly erected in the work room or machine room. On the other hand, the apparatus also can be operated at the suction side in the event that there is periodically or continuously effective a negative pressure at the outlet connection.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 2:
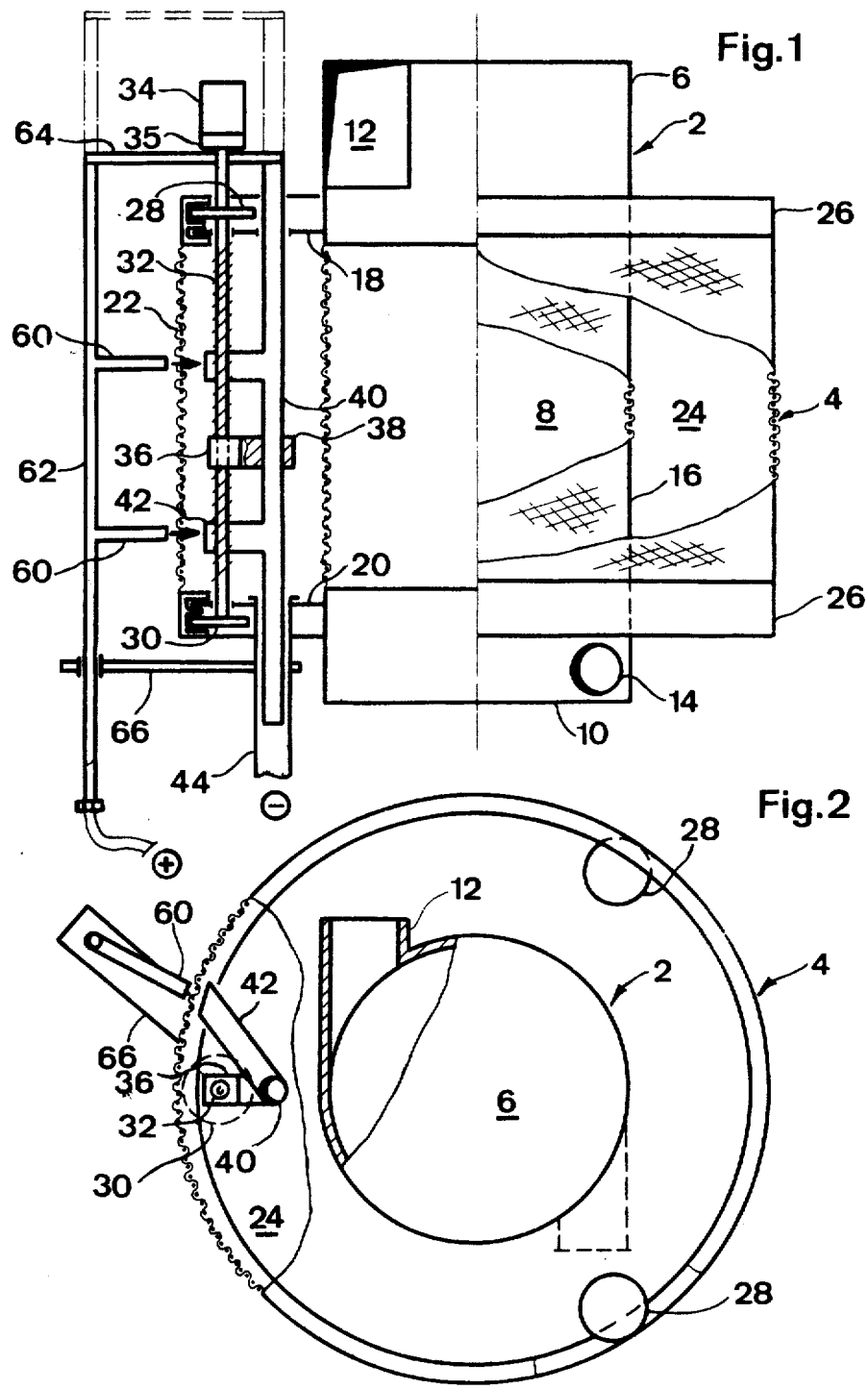
FIG. 1 is an axial sectional view through the apparatus of the present invention.
FIG. 2 illustrates the apparatus in plan view, partially in sectional view.

Describing now the drawings, it is to be understood that reference numeral 2 generally designates a pre-separator and reference numeral 4 designates a filter drum surrounding such pre-separator. The pre-separator 2 is composed of three substantially cylindrical partial portions or elements, namely an inlet portion 6, a separator or jacket portion 8 and anoutlet portion 10. The inlet portion 6 possesses a tangentially directed inlet connection 12 for contaminated air. Inlet connection 12, viewed in cross-section, is for instance of essentially rectangular configuration. At the outlet portion 10 there is provided an outlet or discharge connection 14 for coarser contaminants, for instance fibers, which likewise is tangentially arranged. The separator portion 8, which is disposed between the inlet portion 6 and the outlet portion 10, is bounded by a substantially cylindrical sieve surface 16.

The pre-separator 2 carries at the outside thereof and to both sides of the sieve surface 16 a respective substantially ring-shaped end wall 18 and 20. These end walls 18 and 20, in conjunction with a substantially cylindrical filter body 22, bound a filter compartment or space 24. The filter body 22 is clamped at both ends in races or travelling or barrel rings 26 which engage over the end walls or surfaces 18 and 20 with running clearance. The travelling rings 26 are mounted upon three respective wheels 28 and friction wheels 30 offset from one another through an angle of 120°. The wheels 28 are freely rotatably mounted in any suitable and therefore not particularly illustrated manner at the outside of the end walls 18 and 20. On the other hand, the friction wheels 30 are rigidly connected for rotation upon a thread spindle 32 rotatably mounted in the end walls 18 and 20. The threaded spindle 32, which is operatively coupled by means of reduction gearing 35 with a drive motor 34 arranged externally of the filter drum 4, carries a spindle nut 36 arranged in the filter compartment 24 and at which there is fastened a support 38. The support 38 engages about a telescopic tube 40 which extends substantially parallel to the threaded spindle 32 and to the axis of the filter drum 4. The telescopic tube 40, which carried two suction nozzles 42 which extend towards the inside or inner surface of the filter body 22, is closed at one end guided in the end wall 18, whereas the other end is telescopically displaceable in a suction connection 44 secured to the end wall 20.

The described apparatus communicates by means of its inlet connection 12 for instance with the end of a transport or collecting conduit (not shown) for fibers and dust. This transport conduit, located at the pressure side of a ventilator or the like, is connected at its suction side for instance with a multiplicity of textile machines or their suction systems, as the case may be. The outlet connection 14 continuously flow communicates for instance with a not particularly illustrated collecting container for the separated fibers. Finally, there is connected a further ventilator with the suction connection 44, which for instance feeds into a dust collector.

During operation, the air charged with fibers and dust moves through the connection 12 into the inlet portion 6 of the pre-separator 2. In this inlet portion 6 there is formed, owing to the tangential arrangement of the connection 12, a spin or twist flow which moves within the separator portion 8. The flow travels along the inner surface or inside of the sieve surface 16 through which air and dust penetrate at a number of locations, whereas the fibers are held back by such sieve surface and transported into the outlet or discharge portion 10. The flow prevailing within the separator portion 8 wipingly moves the fibers along the inside of the sieve surface 16. The fibers collected at the outlet portion 10, along with the residual proportion of air, arrive through the outlet connection 14 at the fiber collecting container.

The main flow of air charged with dust which arrives at the filter compartment 24, moves towards the inside or inner surface of the filter body 22. During passage of the air through the filter body 22 the dust is held back at such inner surface.

In order to maintain the effectiveness of the apparatus during continuous operation, the inner surface of the filter body 22 is continuously or intermittently or as a function of the pressure, acted upon by the suction nozzles 42. The suction nozzles 42 move in the axial direction of the filter body whenever the threaded spindle 32 driven by the motor 34 displaces the telescopic tube 40 via the spindle nut 36. In the terminal positions of the telescopic tube 40 there is reversed, by any conventional and therefore not particularly illustrated means, such as reversing switches, the direction of rotation of the motor 34 and thus the spindle 32. On the other hand, the rolling of the friction wheels 30 upon the races or travelling rings 26 causes rotation of the filter drum 4, so that the filter body 22 moves past the nozzles 42 in the peripheral direction.

While the action of the suction nozzles 42 can be adequate for removing the dust from the inner surface of the filter body 22, situations are conceivable where such suction action is not sufficient to achieve a satisfactory cleaning of the filter body. For instance, the appearance of dust at or in the filter body can be particularly intense and/or for economical reasons it can be desirable to design the suction apparatus to operate at a relatively low negative pressure. What is of course equally possible is that for a given suction action of the suction nozzles 42 the complete cleaning of the filter body takes too long in relation to the dust formation.

Hence, in order to intensify the action of the suction nozzles 42 employed for cleaning the filter body 22, it can be advantageous to operatively associate therewith compressed air nozzles or blow nozzles 60. These blow nozzles 60 which are arranged externally of the filter body 22, opposite and essentially in alignment with the suction nozzles 42 and are connected with a suitable source of blowing air, typically compressed air, are capable of detaching dust particles from the filter body 22 due to the effluxing jets of blast air. Further, since the blast air jet emanating from each blow nozzle 60 is directed towards the mouth of the associated suction nozzle 42 the dust particles reach the operable or effective zone of such suction nozzles and are positively removed by the sucked-up air.

These blow air nozzles 60 can be attached to or connected at a distributor conduit or pipe 62 arranged essentially parallel to the telescopic tube or conduit 40 and equally located externally of the filter body 22, as best seen by referring to FIG. 1. The tube or conduit 62 can be rigidly connected for instance at its upper end by means of the attachment bracket 64 or equivalent structure with the telescopic tube 40. Accordingly, the pipe or conduit 62 supporting the blow nozzles 60 synchronously follows the movements of the telescopic tube 40, so that these blow nozzles 60 retain their position relative to the suction nozzles 42. A guide member 66 may be provided at the lower region of the pipe or conduit 62 and slidably engages about the suction connection 44 in order to facilitate guiding of the pipe 62. It has been found to be particularly effective to the blow filter body 22 by means of blow nozzles connected with a compressed air source, for instance the compressed air-supply network of the factory or mill.

While there are shown and described present preferred embodiments of the invention, it is to be distinctly understood that the invention is not limited thereto, but may be otherwise variously embodied and practiced within the scope of the following claims.

What is claimed is:

1. An apparatus for cleaning air charged with contaminants, especially fibers and dust, comprising a pre-separator, a dust filter cooperating with the pre-separator, said dust filter comprising a rotatable filter drum having a substantially cylindrical filter body possessing a filter, at least one movable suction nozzle effective at the filter of the dust filter, said pre-separator comprising a body of rotation having an inlet portion structured for generating a spin flow and a jacekt portion structured as a sieve surface, said filter drum surrounding the jacket portion of the pre-separator, said filter having an inner surface, the movable suction nozzle being operatively associated with the inner surface of the filter, and drive means operatively connected with the suction nozzle and the filter drum.

2. The apparatus as defined in claim 1, including a telescopic tube arranged externally of the pre-separator and substantially axially parallel to the lengthwise axis of the filter drum, said telescopic tube supporting said suction nozzle.

3. The apparatus as defined in claim 2, wherein the filter drum is mounted substantially coaxially with respect to the pre-separator, said drive means comprising friction wheels, said filter drum having travelling rings, said friction wheels engaging with said travelling rings.

4. The apparatus as defined in claim 3, said drive means including a rotatably mounted threaded spindle which is substantially axially parallel with respect to the telescopic tube, said threaded spindle being rigidly connected for rotation with the friction wheels, a spindle nut carried by the threaded spindle, said spindle nut entrainably engaging with the telescopic tube.

5. The apparatus as defined in claim 1, wherein the inlet portion comprises a substantially tangentially directed inlet connection.

6. The apparatus as defined in claim 1, further including at least one blow nozzle, means mounting the blow nozzle to be effective in the direction of said suction nozzle.

7. The apparatus as defined in claim 6, wherein said mounting means synchronizes the movement of the blow nozzle with that of the suction nozzle in order to maintain the relative position between said blow nozzle and said suction nozzle.

* * * * *